Nov. 7, 1933.　　　K. H. MOLL ET AL　　　1,934,082
REDUCTION OF ORE
Filed July 30, 1931
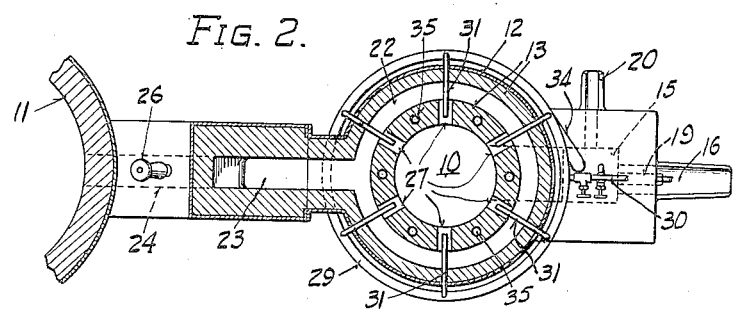
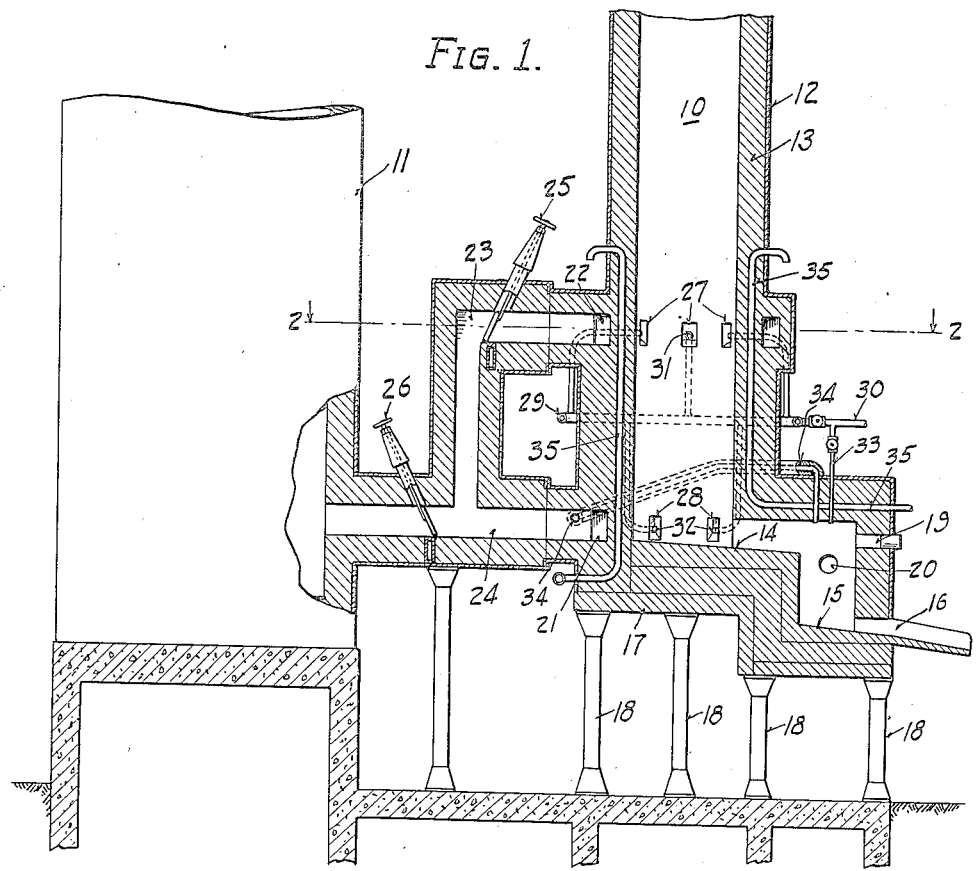
INVENTORS:
Karl Hermann Moll
Harold Etherington
David F. Smith
BY
ATTORNEY.

Patented Nov. 7, 1933

1,934,082

UNITED STATES PATENT OFFICE 1,934,082

REDUCTION OF ORE

Karl Hermann Moll and Harold Etherington, Milwaukee, and David F. Smith, Whitefish Bay, Wis., assignors to A. O. Smith Corporation, Milwaukee, Wis., a corporation of New York Application July 30, 1931. Serial No. 553,949

8 Claims. (Cl. 75—75)

This invention relates to the conversion of iron ore into pig iron or steel and especially to methods and means of utilizing gas for this purpose.

In the reduction of iron ore by means of gas in shaft furnaces, as constructed and operated heretofore, the charge has a tendency to agglomerate and stick to the sides of the shaft, the result being that the charge solidifies, thereby preventing a uniform reduction of the ore and a uniform passage of the charge through the shaft. Under such conditions the waste gases ordinarily given off tend to accumulate beneath the charge. When the waste gases are brought into contact with the air they are likely to explode and wreck the furnace.

Furthermore, in furnaces of this type, as constructed and operated heretofore, the charge in its descent through the shaft came into contact with the molten metal in the hearth, thereby chilling the metal and seriously interfering with the composition of the finished product.

One of the main objects of the present invention is to provide for the free passage of the charge through the shaft of the furnace when converting iron ore into steel or pig iron.

Another object of the present invention is to rapidly convert the charge to the state of liquifaction as it passes from the reducing zone to the melting zone.

Another object of the present invention is to prevent the charge from coming into contact with molten metal in the hearth of the furnace.

Other objects of the invention will be apparent from the following description.

In describing the invention, reference will be made to the drawing in which:

Figure 1 is an elevational view partially in cross section of an ore reducing apparatus, and Fig. 2 is a plan view partially in cross section taken along the line 2—2 of Fig. 1.

The apparatus comprises a furnace 10 and a heater 11. The walls of the furnace comprise an outer cylindrical casing of steel 12 and an inner lining of fire brick or other suitable heat refractory material 13. The base portion of the furnace comprises a hearth 14 and a forehearth 15, the floors of which are inclined to permit the ready flow of molten metal from hearth 14 into forehearth 15 and from forehearth 15 through a tap hole 16 into a ladle or other suitable receptacle. Hearth 14 and forehearth 15 are supported by an offset metallic base plate 17 which in turn rests on supports 18. A peep hole 19 is provided to permit the inspection of the metal as it is collected in the forehearth. A slag hole 20 is also provided to remove the slag ordinarily formed during the melting operation.

An air chamber 21 which is formed within the lining of fire brick 13 passes around the base portion of the stack while a similar air chamber 22 extends around the stack at a higher level which level may be approximately one quarter the distance up the stack from the base. The air chambers 21 and 22 are connected to the air preheater 11 by means of heat insulated pipes 23 and 24, valves 25 and 26 being inserted in the pipes to permit regulation of the air flowing from the preheater to the air chambers.

As shown more clearly in Fig. 2, a battery of tuyères 27 lead from air chamber 22 to the interior of the stack. Likewise a battery of tuyères 28 lead from air chamber 21 to the interior of the stack. A bustle pipe 29 connected to a source of suitable gas by means of pipe 30 encircles the outer wall of the furnace. From this bustle pipe 29, gas outlet pipes 31 extend through the outer wall of the furnace, and are directed through tuyères 27 toward the interior of the stack. Similar gas outlet pipes 32 also extend from bustle pipe 29 through the outer wall of the furnace, and are directed through tuyères 28 toward the interior of the stack. A branch gas line 33 extends through the roof of the forehearth 15, the air for burning this gas being supplied by a heat insulated air pipe 34 which is in direct communication with air pipe 24. Suitable valves are inserted in all of these lines to permit regulation of the amount of air or gas flowing therethrough.

Pipes 35 which are connected to a suitable source of heat dissipating fluid such as cold water are embedded in the walls and around the hearth of the furnace to protect the furnace and hearth from the excessive heat ordinarily maintained in the melting zone.

As illustrative of one method of producing pig iron or steel in accordance with the present invention, the shaft is charged with a mixture composed of iron ore and sufficient limestone to flux the impurities contained in the ore. Heated air at a temperature of approximately 1000° C. and butane are introduced through tuyères 28 and pipes 32 respectively, the air being introduced at approximately 1000 cu. ft. per minute and the gas at approximately 50 cu. ft. per minute. The mixture of air and butane produces a non-oxidizing flame and an intense heat sufficient to melt the ore and slag the impurities. The melted product flows into the forehearth where it is collected and finally tapped into a ladle or other convenient receptacle.

The highly heated gases produced during the smelting of the charge pass upwardly in the shaft and mingle with butane which is introduced through gas pipes 31 at the rate of approximately 25 cu. ft. per minute. This produces a decomposition of the butane, and the hot gas mixture comprising carbon monoxide, carbon dioxide, water, hydrogen and nitrogen thus produced passes upwardly and reduces the oxide of iron to sponge iron. The decomposition of the butane serves to reduce the temperature of the hot gases ascending from the melting zone, thus preventing the charge above the melting zone from being heated to a temperature which will cause the charge to hang up in the shaft. In the upper part of the shaft, the gases become depleted in reducing agents and they act mainly to preheat the ore. The gases then pass out of the shaft and they may be burned for preheating the air or for any other desired purpose.

The temperature of the ascending gases in the reducing zone should be high enough to give rapid reduction of the oxides but it should be lower than the melting point of the oxides to be reduced. By burning greater volumes of mixed gas and air in the melting zone and by adding less butane to the ascending gases, the temperature of the reducing zone may be raised. By reverse regulation of the ascending gases and butane, the reducing zone may be cooled but in all events the temperature in the melting zone must be maintained high enough to smelt the metal and form slag from the impurities which are mixed with the reduced iron and the charge. Thus by balancing the volumes of gas with the temperatures attained in the melting zone, the temperature for smelting the iron, gangue and flux in the base portion, the temperatures for the solid reduction of the oxides in the upper portion of the shaft and the cooling necessary to bring about a rapid heating of the solid reduced material to melting temperatures are maintained.

In case more heat is required to raise the ore to reducing temperatures in the upper portion of the shaft than it is possible to obtain by combustion of air and gas in the melting zone, additional heated air and butane may be admitted through tuyères 27 and pipe 31 respectively. This would have the effect of burning a part of the gases in the lower portion of the reducing zone thereby providing the additional heat required.

In blowing in the furnace, the shaft is filled to approximately three-quarters its capacity with coke and the remainder is filled with charge. Heated air is blown through tuyères 28 to burn the coke, thereby heating the walls of the furnace and the superimposed charge to reducing temperatures. As the coke is consumed the charge becomes reduced and gas is admitted through pipes 32. As the charge settles into the melting zone, it is smelted under the influence of the heat generated by the burning of the gas. The coke is finally eliminated by combustion and by solution in the melted iron and thereafter the smelting is done solely by the combustion of gas admitted through pipes 32. In the event additional heat is required to maintain the charge in the state of fusion in the forehearth, it is obtained by admitting a suitable mixture of gas and air through pipes 33 and 34, respectively.

The normal operation of the furnace comprises charging the mixture of iron ore and fluxing material into the top of the shaft, in regulating the heated air and gas introduced into the base of the melting zone to produce a smelting flame and in regulating the quantity of reducing gas introduced through pipes 31 in the reducing zone so that the reduced charge is kept below temperatures of agglomeration. Also, the operation of the furnace consists in balancing the cooling effect of the endothermic reaction at the foot of the reducing zone with the highly heated gases ascending from the melting zone so that the reduced iron will pass from a zone which is heated to temperatures below that at which the charge tends to agglomerate to a zone which is heated above the melting point of the charge without passing through an intermediate zone of constantly increasing temperature. Furthermore, the operation of the furnace consists in permitting the molten metal as it settles in the hearth to flow into the forehearth, otherwise melted metal would accumulate in the shaft and the charge would come into contact with the molten metal thereby cooling and seriously interfering with the composition of the finished product.

The term "smelting flame" as used in the specification and claims refers to flames which are slightly reducing and to flames which are slightly oxidizing as well as to flames which are neutral. High temperatures and atmospheres which are not strongly oxidizing are important considerations to observe in the operation of the melting zone. However, deviations from exact neutrality on the reducing side and on the oxidizing side do not seriously affect the production of high temperatures in the melting zone or the composition of the gases which ascend through the shaft for the purposes of heating and reducing the charge.

Other hydrocarbons such as methane which react endothermically upon decomposing, or mixtures of hydrocarbons can be used. Natural gas is an example of a mixture of gases which can be utilized in practicing the invention.

In passing a charge downwardly through a shaft which is heated to high temperatures at the bottom, the temperature of the charge normally decreases gradually as the distance from the most highly heated portion increases. When an intermediate portion of the charge consists of reduced iron, there will be a zone of considerable length where the charge is soft enough to weld together. Without means for cooling the ascending gases, such as the addition of hydrocarbons and the endothermic reaction produced thereby, the charge would gradually increase in temperature in passing from the reducing zone to the melting zone with the result that the reduced iron would gradually soften before the iron became liquefied. Under the influence of the load in the reducing zone, the charge while in this condition would be forced to the sides of the shaft where it would adhere. According to our invention, the reduced ore is kept below the temperatures of agglomeration until just before it is rapidly heated to fusion.

While gases having an endothermic reaction are preferably employed, other reducing gases such as hydrogen may be employed. In this case, the temperature of the reducing gas which is introduced through pipes 31 would be kept sufficiently low to locally cool the ascending gases to a temperature below that at which the charge would tend to agglomerate. Furthermore in certain instances it may be desirable to use a combustible gas such as hydrogen in the melting zone and a hydrocarbon gas as the reducing gas or vice versa, that is, to use a hydrocarbon gas in the melting zone and hydrogen as the reducing gas.

The amount of carbon in the finished product may be controlled in a number of ways, preferably, however, the carbon is added by combining a certain percentage of coke with the charge of iron ore and limestone. More or less coke will give higher or lower values of carbon respectively. In addition to providing carbon, the added coke serves as a diluent and aids in the free passage of the charge and the gases through the shaft of the furnace. A highly porous charge, and one wherein the carbon content in the finished product is within the steel range, may be produced by adding about 10% to 20% coke. Furthermore, the carbon dioxide and steam liberated during the combustion of the coke are reduced in the upper zones of the shaft and the products of reduction serve as reducing agents.

Another satisfactory manner of carburizing the metal is to blow in coal dust through tuyères at the base of the reducing zone. In this case the carbon liberated during decomposition has little or no opportunity to become oxidized by the carbon dioxide and steam; hence, it is readily absorbed by the molten metal in the melting zone. Still another satisfactory method of adding carbon is to use an excess of butane at the base of the reducing zone. In this case the excess carbon produced by the decomposition of the butane is absorbed by the molten metal. Also another satisfactory method of introducing carbon is to force free carbon into the molten metal through the roof of the forehearth.

While the description of this invention has been specifically directed to the reduction and melting of iron ores, it is to be distinctly understood that the invention is applicable to the reduction and melting of ores other than iron ores.

We claim:

1. In the method of reducing a charge comprising a mixture of iron ore and flux in a vertically disposed shaft, the steps which comprise smelting the charge in the lower portion of the shaft by the combustion of gas and preheated air, reducing the charge in the upper portion of the shaft by contact with a reducing gas and heated gases ascending from said lower portion, adding reducing gas for locally cooling said ascending gases immediately above the point of fusion, and draining said charge from the base of said shaft as rapidly as said charge is smelted.

2. In the method of reducing a charge comprising a mixture of iron ore and flux in a vertically disposed shaft, the steps which comprise reducing the charge in the upper portion of the shaft, then smelting the charge in the lower portion of the shaft by the combustion of a mixture of air and combustible gases, and locally cooling the gases ascending from said lower portion in a locality between said upper and said lower portions.

3. In the method of reducing a column of charge comprising a mixture of iron ore and flux in a vertically disposed shaft, the steps which comprise continuously passing said charge through a reducing zone, adding reducing gases in said zone for reducing the ore, passing the reduced material into a melting zone, burning a mixture of air and hydrocarbon in said melting zone to produce a melting flame for abruptly raising the temperature of said reduced charge to temperatures above the melting point of said charge, and continuously passing the products of combustion into said reducing zone for heating the charge to reducing temperatures.

4. The method of producing steel which comprises charging a mixture of iron oxide and flux into a vertical shaft furnace, passing hydrocarbon gas into the charge in a portion of the shaft which is intermediate the ends thereof so as to maintain temperatures thereabove which are as high as reducing temperatures and below agglomerating temperatures of the charge, melting the reduced iron in a lower portion of the shaft by the combustion therein of hydrocarbon gas which is admitted directly into the reduced charge, and passing upwardly through the charge the heated gases which result from said combustion.

5. The method of producing steel which comprises charging a mixture of iron oxide and flux in a vertically disposed shaft furnace, passing a reducing gas into the charge in a portion of the shaft which is intermediate the ends thereof so as to maintain temperatures thereabove which are as high as reducing temperatures and below agglomerating temperatures of the charge, melting the reduced iron by the combustion of a mixture of air and gas which are admitted in a lower portion of the shaft, and draining the molten metal from said lower portion of the shaft as rapidly as said molten metal is formed.

6. The method of producing a fused metal from iron oxides which comprises charging a mixture of iron oxide, flux and a small amount of coke into a vertical shaft furnace, passing hydrocarbon gas into the charge at points in the shaft which are intermediate the ends thereof so as to maintain temperatures thereabove which are as high as reducing temperatures and below agglomerating temperatures of the charge, melting the reduced iron in the presence of flux by the combustion of hydrocarbon gas which is admitted into said iron and flux in a lower portion of the shaft, and utilizing the excess heat from the combustion for heating the oxides and said reducing gas to reducing temperatures.

7. The method of reducing oxide ores which comprises continuously passing a column of charge which comprises ore and flux into a vertically disposed shaft, passing the charge through a reducing zone in contact with reducing gases, regulating the temperature of the reducing zone by adding reducing gas to maintain temperatures below the softening temperatures of the materials contained therein, continuously passing the reduced material into a melting zone, and abruptly raising the temperature of the reduced charge and melting the same by burning a mixture of air and hydrocarbon in a relatively narrow zone directly below the reducing zone.

8. The method of reducing oxide ores which comprises continuously passing a column of charge which comprises ore and flux into a vertically disposed shaft, passing the charge through a reducing zone in contact with reducing gases, adjusting the temperature of the gases ascending into the reducing zone to temperatures below the softening temperatures of the materials contained therein by adding reducing gas thereto, continuously passing the reduced material into a melting zone, and abruptly raising the temperature of the reduced charge and melting the same by burning a mixture of air and hydrocarbon in a relatively narrow zone directly below the reducing zone.

KARL HERMANN MOLL.
HAROLD ETHERINGTON.
DAVID F. SMITH.